United States Patent
Bredemann

(10) Patent No.: US 8,878,473 B2
(45) Date of Patent: Nov. 4, 2014

(54) REDUCING CURRENT REVERSAL TIME IN ELECTRIC MOTOR CONTROL

(75) Inventor: Michael V. Bredemann, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 302 days.

(21) Appl. No.: 13/152,067

(22) Filed: Jun. 2, 2011

(65) Prior Publication Data

US 2014/0103845 A1  Apr. 17, 2014

(51) Int. Cl.
*H02H 7/08* (2006.01)
(52) U.S. Cl.
USPC .................. 318/400.21; 318/400.22

(58) Field of Classification Search
USPC .............. 318/400.21, 400.22, 400.26, 400.29
See application file for complete search history.

(56) References Cited

U.S. PATENT DOCUMENTS

| | | | | |
|---|---|---|---|---|
| 5,227,704 A | * | 7/1993 | Erdman | 318/400.34 |
| 5,408,150 A | * | 4/1995 | Wilcox | 327/108 |
| 5,859,519 A | * | 1/1999 | Archer | 318/801 |
| 6,307,345 B1 | * | 10/2001 | Lewis | 318/696 |
| 6,943,514 B1 | * | 9/2005 | Chen et al. | 318/400.29 |
| 2005/0122074 A1 | * | 6/2005 | Gerfast | 318/254 |

* cited by examiner

*Primary Examiner* — Rina Duda
(74) *Attorney, Agent, or Firm* — Michael A. Beckett

(57) ABSTRACT

The time required to reverse current flow in an electric motor is reduced by exploiting inductive current that persists in the motor when power is temporarily removed. Energy associated with this inductive current is used to initiate reverse current flow in the motor.

10 Claims, 10 Drawing Sheets

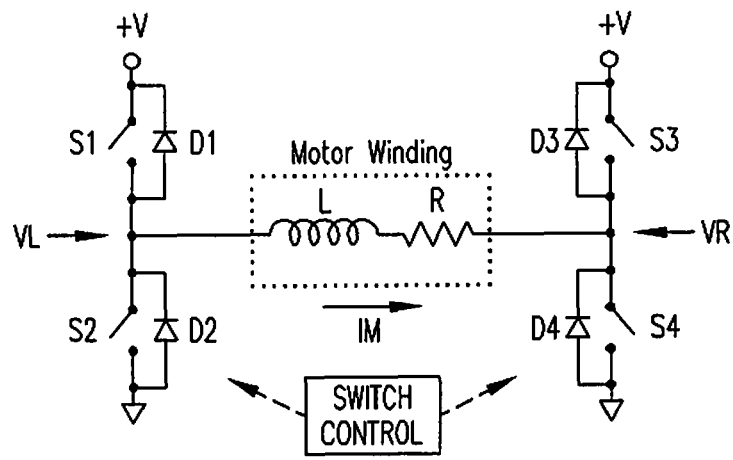
FIG. 1
(PRIOR ART)
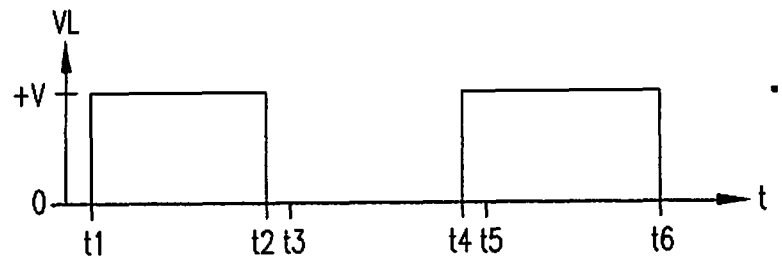
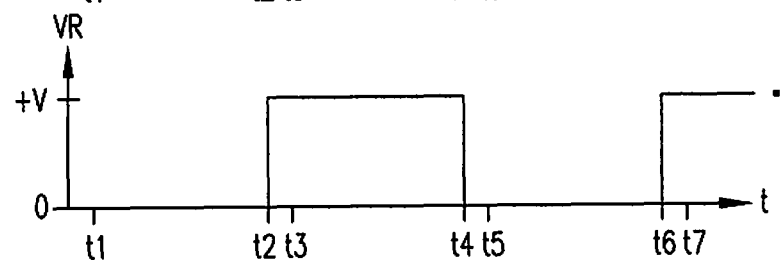
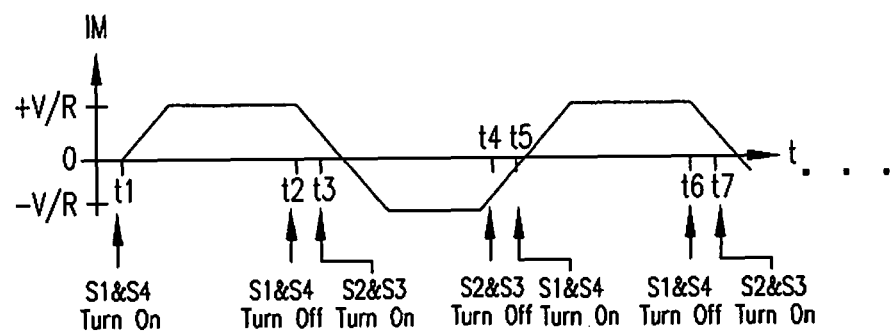
FIG. 2
(PRIOR ART)

| Time | Switch Config. | S1 | S2 | S3 | S4 |
|---|---|---|---|---|---|
| --- | #1 | Open | Open | Open | Open |
| t1 | #2 | Closed | Open | Open | Closed |
| t2 | #1 | Open | Closed | Open | Open |
| --- | #3 | Open | Closed | Closed | Open |
| t3 | #4 | Open | Closed | Closed | Open |
| t4 | #1 | Open | Open | Open | Open |
| --- | #5 | Open | Open | Open | Closed |
| t5 | #2 | Closed | Open | Open | Closed |
| t6 | #1 | Open | Open | Open | Open |
| --- | #3 | Open | Closed | Open | Open |
| t7 | #4 | Open | Closed | Closed | Open |
| --- | #1 | Open | Open | Open | Open |
| --- | #5 | Open | Open | Open | Closed |
| --- | #2 | Closed | Open | Open | Closed |
| --- | #1 | Open | Open | Open | Open |
| ⋮↓V | ⋮↓V | ⋮↓V | ⋮↓V | ⋮↓V | ⋮↓V |

*FIG. 6*

| Time | Switch Config. | S1 | S2 | S3 | S4 |
|---|---|---|---|---|---|
| --- | #1 | Open | Open | Open | Open |
| t1 | #2 | Closed | Open | Open | Closed |
| t2 | #1 | Open | Open | Open | Open |
| --- | #3A | Open | Open | Closed | Open |
| t3 | #4 | Open | Closed | Closed | Open |
| t4 | #1 | Open | Open | Open | Open |
| --- | #5A | Closed | Open | Open | Open |
| t5 | #2 | Closed | Open | Open | Closed |
| t6 | #1 | Open | Open | Open | Open |
| --- | #3A | Open | Open | Closed | Open |
| t7 | #4 | Open | Closed | Closed | Open |
| --- | #1 | Open | Open | Open | Open |
| --- | #5A | Closed | Open | Open | Open |
| --- | #2 | Closed | Open | Open | Closed |
| --- | #1 | Open | Open | Open | Open |
| ⋮ | ⋮ | ⋮ | ⋮ | ⋮ | ⋮ |
| V | V | V | V | V | V |

*FIG. 10*

| Time | Switch Config. | S1 | S2 |
|---|---|---|---|
| --- | #101 | Open | Open |
| t1 | #201 | Closed | Open |
| t2 | #101 | Open | Open |
| --- | #301 | Open | Closed |
| t3 | #301 | Open | Closed |
| t4 | #101 | Open | Open |
| --- | #201 | Closed | Open |
| t5 | #201 | Closed | Open |
| t6 | #101 | Open | Open |
| --- | #301 | Open | Closed |
| t7 | #301 | Open | Closed |
| --- | #101 | Open | Open |
| ⋮ | ⋮ | ⋮ | ⋮ |

REDUCING CURRENT REVERSAL TIME IN ELECTRIC MOTOR CONTROL

This invention was developed under Contract DE-AC04-94AL85000 between Sandia Corporation and the U.S. Department of Energy. The U.S. Government has certain rights in this invention.

FIELD

The present work relates generally to controlling electric motors and, more particularly, to reversing current in windings of electric motors.

BACKGROUND

In systems that use multi-phase electric motors, it is frequently desirable to optimize operation in terms of both speed and power consumption. Examples include rotation of a DC stepper motor from one angular position to another in minimal time with minimal power consumption, and operation of a brushless DC motor at a maximum spin rate with minimal power consumption. DC stepper motors rotate by a single step in response to a reversal of current flow through an appropriate winding of the motor. In similar fashion, brushless DC motors advance in one direction or the other in response to reversal of current flow through the appropriate winding.

It is desirable in view of the foregoing to provide for a reduction in the time required to reverse the current flow in a winding of an electric motor, without requiring an attendant increase in power consumption.

BRIEF DESCRIPTION OF THE DRAWINGS

FIG. 1 diagrammatically illustrates an apparatus for controlling current in an electric motor winding according to the prior art.

FIG. 2 is a timing diagram of the operation of the apparatus of FIG. 1.

FIG. 6 illustrates in tabular format a sequence of switching configurations that may be assumed by the current switching structure of FIG. 3 in response to the switch controller of FIG. 3 according to exemplary embodiments of the present work.

FIG. 10 illustrates in tabular format a sequence of switching configurations that may be assumed by the current switching structure of FIG. 7 in response to the switch controller of FIG. 7 according to exemplary embodiments of the present work.

DETAILED DESCRIPTION

The motor windings of conventional electric motors are commonly driven by what is known as an H-Bridge circuit, such as shown in FIG. 1. The motor winding is shown as an inductance L and a resistance R in series. The structure and operation of the H-Bridge are well known in the art. The circuit includes a left high side switch, S1, a left low side switch, S2, a right high side switch, S3, and a right low side switch, S4. Desired reversals of current flow through the motor winding may be accomplished by operating the switches S1-S4 of FIG. 1 in the manner shown in FIG. 2. A switch controller controls opening and closing of the switches. (In FIG. 2, as well as in FIGS. 5, 9 and 15 discussed hereinbelow, the phrase "turn on" means closing the switch(es), and the phrase "turn off" means opening the switch(es).) FIG. 2 also shows graphically the FIG. 1 voltages VL and VR, and the FIG. 1 winding current IM produced by the sequence of switch operations shown in FIG. 2. Referring again to FIG. 1, the diodes D1-D4 are connected in parallel with the respective switches S1-S4 to clamp to the voltage rails (+V and ground) the inductive current (often referred to as freewheeling current) that persists in the motor winding when the switches of the currently closed switch pair (pair S1/S4 or pair S2/S3) are opened to eliminate current flow through the motor winding (in preparation for the desired current reversal).

Exemplary embodiments of the present work reduce the time required to reverse the current flow in a motor winding, without requiring an increase in power consumption. This is achieved in some embodiments by using the aforementioned freewheeling inductive current to produce "flyback" voltages rather than clamping that current to the voltage rails as in the prior art. The flyback voltages are then available to initiate the desired reverse current flow more quickly than is possible using the conventional H-bridge of FIG. 1. Inductive current that persists in the winding when power is temporarily removed is exploited. Energy is stored or released in cooperation with this inductive current, and this energy is used to initiate reverse current flow in the winding.

Figure 3:
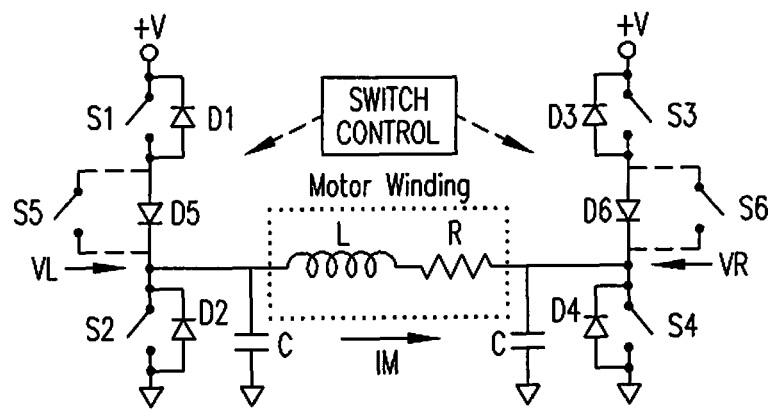
FIG. 3 diagrammatically illustrates an apparatus for controlling current in an electric motor winding according to exemplary embodiments of the present work.
Figure 4:
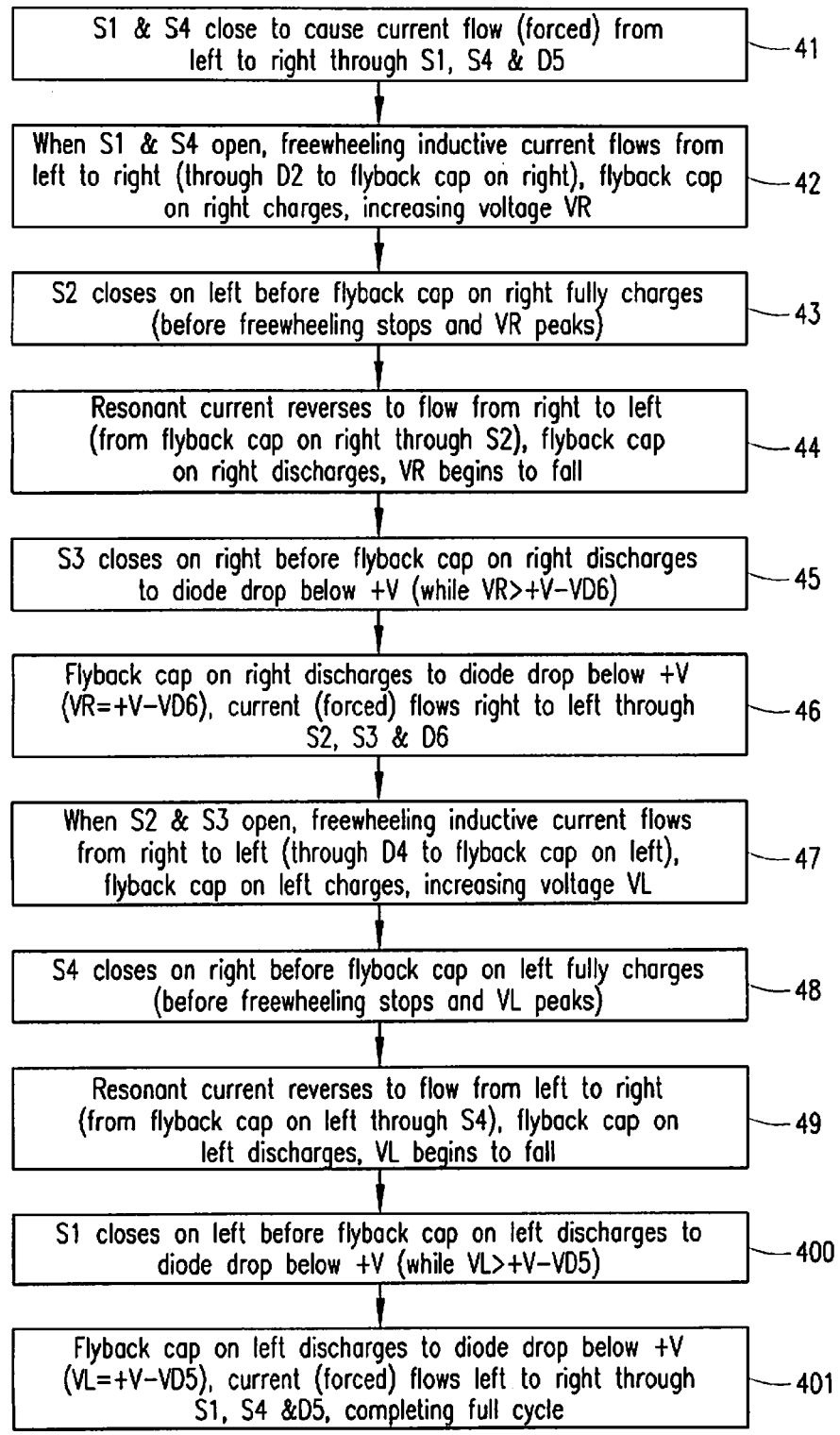
FIG. 4 is a flow diagram of operations that may be performed by the apparatus of FIG. 3 according to exemplary embodiments of the present work.

As shown in FIG. 3, some embodiments of the present work provide a current switching structure generally similar to the H-Bridge of FIG. 1, but including diodes D5 and D6, which ensure that the aforementioned freewheeling inductive current is not clamped to the voltage rails in the manner described above relative to FIG. 1. Capacitors C respectively couple opposite nodes of the motor winding to ground. These capacitors are charged by the aforementioned freewheeling inductive currents that persist in the motor winding when the switches of the currently closed switch pair (pair S1/S4 or pair S2/S3) are opened to isolate the motor winding from power supply current (in preparation for the desired current reversal). After the switch controller of FIG. 3 closes the low side switch of the pair (S2 or S4), the charged capacitor C on the opposite side of the motor winding discharges through the motor winding and the closed switch, thereby reversing the current earlier than in the H-Bridge of FIG. 1. Closing the other switch (S3 or S1) of the cooperating switch pair allows power supply current to flow through the motor winding (from +V to ground) in the same direction as the aforementioned capacitor discharge current. A detailed example is described below with reference to FIGS. 3-5.

When switches S1 and S4 initially close (see 41 in FIG. 4 and time t1-t2 in FIG. 5), with switches S2 and S3 open, current IM in FIG. 3 flows left-to-right from +V to ground, through S1, D5, the motor winding and S4. When the switch controller opens switches S1 and S4 (see 42 in FIG. 4 and t2 in FIG. 5) to begin the current reversal operation, freewheeling inductive current that persists in the motor winding (flowing left-to-right through D2 to the right side capacitor C in FIG. 3) will charge the right side capacitor C, increasing the voltage VR (this voltage increase is the aforementioned "flyback" voltage). Thereafter, and before the right side capacitor fully charges, the switch controller closes S2 (shown at 43 in FIG. 4 and also shown at a point between time t2 and time t3 in FIG. 5). The resonant current reverses to flow right-to-left from the right side capacitor through switch S2, and the right side capacitor discharges (see 44 in FIG. 4), decreasing the voltage VR. Before the right side capacitor discharges to a diode drop below +V, that is, before the voltage VR in FIG. 3 has decreased to +V−VD6 (where VD6 is the diode drop of diode D6), the switch controller closes switch S3 (see 45 in FIG. 4 and t3 in FIG. 5). When the right side capacitor has discharged sufficiently for voltage VR to reach the level VR=+V−VD6, power supply current begins to flow right-to-left from +V to ground, through switch S3, diode D6, the motor winding, and switch S2 (see 46 in FIG. 4). This completes the initial current reversal operation.

The next current reversal proceeds analogously. With switches S2 and S3 now closed, and switches S1 and S4 now open, and with current IM now flowing right-to-left from +V to ground, through S3, D6, the motor winding and S2, the switch controller opens switches S2 and S3 (see 47 in FIG. 4 and t4 in FIG. 5) to begin the current reversal operation. Freewheeling inductive current persists in the motor winding (flowing right-to-left through D4 to the left side capacitor in FIG. 3) and charges the left side capacitor C, increasing the voltage VL. Thereafter, and before the left side capacitor fully charges, the switch controller closes S4 (shown at 48 in FIG. 4 and also shown at a point between time t4 and time t5 in FIG. 5). The resonant current reverses to flow left to right from the left side capacitor through switch S4, and the left side capacitor discharges (see 49 in FIG. 4), decreasing the voltage VL. Before the left side capacitor discharges to a diode drop below +V, that is, before the voltage VL has decreased to +V−VD5 (where VD5 is the diode drop of diode D5), the switch controller closes switch S1 (see 400 in FIG. 4 and t5 in FIG. 5). When the left side capacitor has discharged sufficiently for voltage VL to reach the level VL=+V−VD5, power supply current begins to flow left-to-right from +V to ground, through switch S1, diode D5, the motor winding, and switch S4 (see 401 in FIG. 4). This completes the second current reversal operation.

Figure 5:
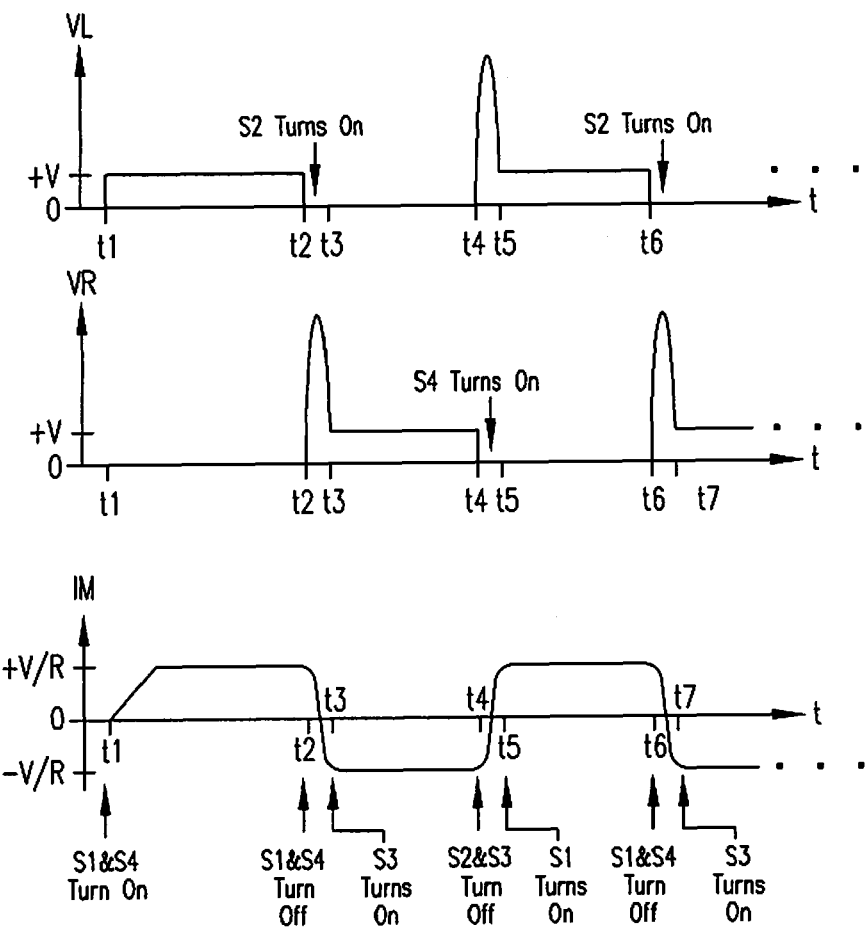
FIG. 5 is a timing diagram of operations that may be performed by the apparatus of FIG. 3 according to exemplary embodiments of the present work.

During the time t6-t7 in FIG. 5, the same switching operations associated with the initial current reversal operation (performed during time t2-t3) are repeated to effect the third current reversal operation. The sequence continues repetitively thereafter, with the fourth current reversal operation (not explicitly shown in FIG. 5) carried out with the same switching operations as for the second current reversal operation (during time t4-t5), and so on.

Because the inductive conduction paths to the high side supply voltage +V are blocked by diodes D5 and D6, and with the capacitors C at each end of the motor to winding, an LC resonance develops at the moment the low side switch (S2 or S4) is turned off. The freewheeling inductive current in the winding inductance is transferred to voltage (at VR or VL) on the associated capacitor. After the energy transfer from the motor winding into the capacitor completes (the transfer is complete when the motor current is zero and the capacitor voltage is maximum) and after closing the other low side switch (S4 or S2), the energy stored in the capacitor is transferred back into the motor winding as current flows through the winding in the opposite direction. Energy is thus stored and recycled upon every current reversal. The time required for current reversal is reduced relative to the current reversal time illustrated in FIG. 2, as readily seen by comparing FIGS. 2 and 5, wherein the time scales are the same such that the times shown at t1-t7 in FIGS. 2 and 5 are in temporal correspondence. Accordingly, the present work extends the maximum possible motor rotation rate (or stepping speed) beyond the capability of the prior art H-Bridge of FIG. 1, without requiring any increase in the power supply voltage or in the power consumed. Similarly, a given rotation/step rate may be achieved with less power consumption and/or at a lower power supply voltage than with the H-Bridge of FIG. 1.

The time required for current reversal decreases with decreasing capacitance values at C in FIG. 3. The flyback voltages increase with decreasing capacitance values, so the motor winding, diodes D2, D4, D5 and D6, and switches S2 and S4 should be designed with a suitably corresponding breakdown voltage characteristic.

FIG. 6 illustrates in tabular format the various configurations that the current switching structure of FIG. 3 sequentially assumes (under control of the switch controller) during the current reversal examples described above with respect to FIGS. 3-5. Time proceeds downwardly in FIG. 6, as indicated by the timing reference points t1-t7 (see also FIG. 5). As shown in FIG. 6, the current switching structure is initially set to switch configuration #1, with all switches open, after which it is controlled to repeat continuously the following sequence of configurations: #2, #1, #3, #4, #1, #5. In configurations #2 and #4, power supply current flows through the motor winding, by virtue of the path between the +V and ground power supply rails. Note the transition from configuration #2 to configuration #4, and the complementary transition from configuration #4 back to configuration #2. During a first interval of each transition, the structure assumes an intermediate configuration #1, wherein all switches are open, and freewheeling inductive current charges the associated capacitor. During respective subsequent intervals of the transitions, the structure assumes respectively associated intermediate configurations #3 and #5, which permit the associated capacitor to discharge a reversed current through the motor winding.

Various other embodiments that use the current switching structure of FIG. 3 employ one or more of following operations with respect to reversing current initially flowing from left to right: (1) switch S4 opens before switch S1 opens, provided switch S1 opens before switch S2 closes; (2) switches S3 and S2 are closed at nearly the same time or shortly after the time that switches S1 and S4 are opened; and/or (3) switch S3 is closed before switch S2 is closed, provided switch S2 is closed before the voltage across the capacitor reaches its maximum value. Various other embodiments that use the current switching structure of FIG. 3 employ one or more of the following operations with respect to reversing current initially flowing from right to left: (1) switch S2 opens before switch S3 opens, provided switch S3 opens before switch S4 closes; (2) switches S1 and S4 are closed at nearly the same time or shortly after the time that switches S2 and S3 are opened; and/or (3) switch S1 is closed before switch S4 is closed, provided switch S4 is closed before the voltage across the capacitor reaches its maximum value.

Referring again to FIG. 3, some embodiments provide switches S5 and S6 respectively in parallel with diodes D5 and D6, as shown by broken line. The switch controller operates the switches S5 and S6 to implement a power saving feature. More specifically, whenever diode D5 or D6 is forward-biased and conducting power supply current, the respectively corresponding switch S5 or S6 may be closed to save power.

Figure 7:
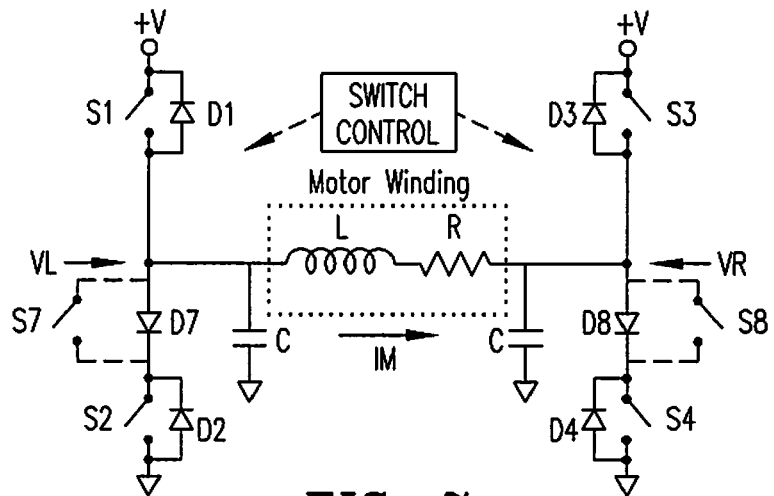
FIG. 7 diagrammatically illustrates an apparatus for controlling current in an electric motor winding according to exemplary embodiments of the present work.

FIG. 7 diagrammatically illustrates a current switching structure according to further exemplary embodiments. The structure of FIG. 7 is generally similar to that of FIG. 3, except the diodes D5 and D6 of FIG. 3 are omitted, and diodes D7 and D8 are provided instead. Diode D7 is provided between the VL node and the S2/D2 combination, and diode D8 is provided between the VR node and the S4/D4 combination. The structure of FIG. 7 operates generally analogously to the above-described operation of the FIG. 3 structure, except the flyback voltages are negative in FIG. 7 due to the aforementioned replacement of diodes D5 and D6 with diodes D7 and D8. These negative flyback voltages are shown in the VR and VL plots of FIG. 9. The example diagram of FIG. 9 is otherwise generally similar to that of FIG. 5, and the times shown at t1-t7 in FIG. 9 temporally corresponding to the times t1-t7 in FIG. 5.

Figure 9:
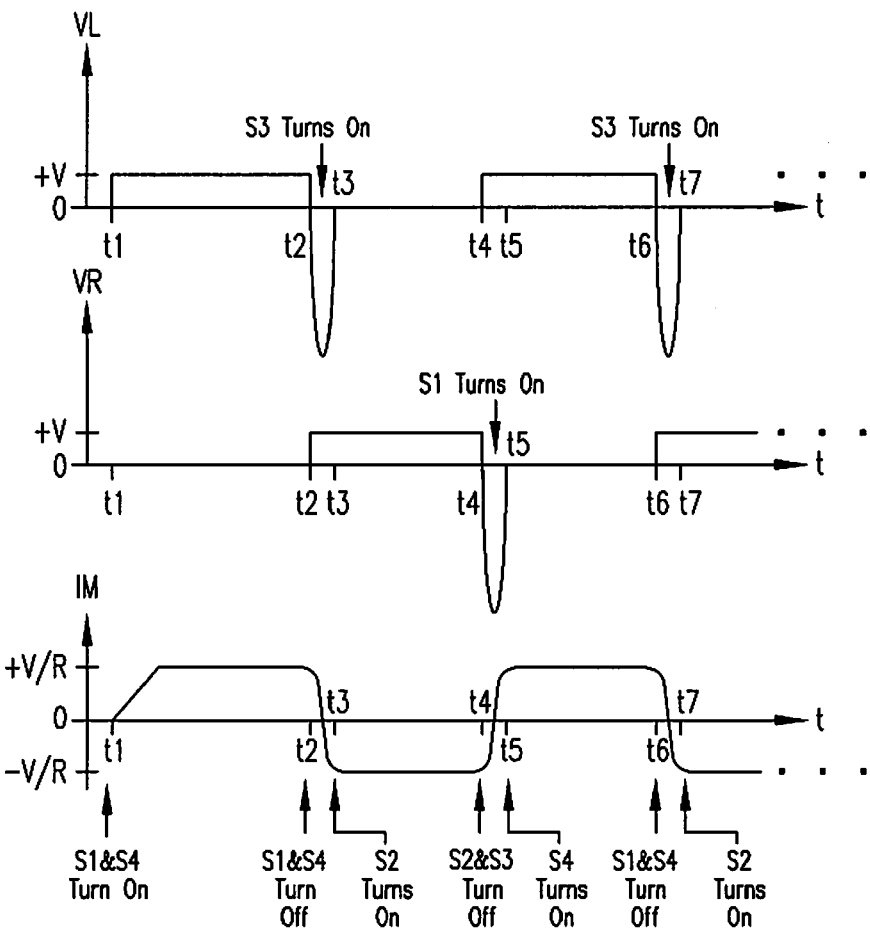
FIG. 9 is a timing diagram of operations that may be performed by the apparatus of FIG. 7 according to exemplary embodiments of the present work.
Figure 8:
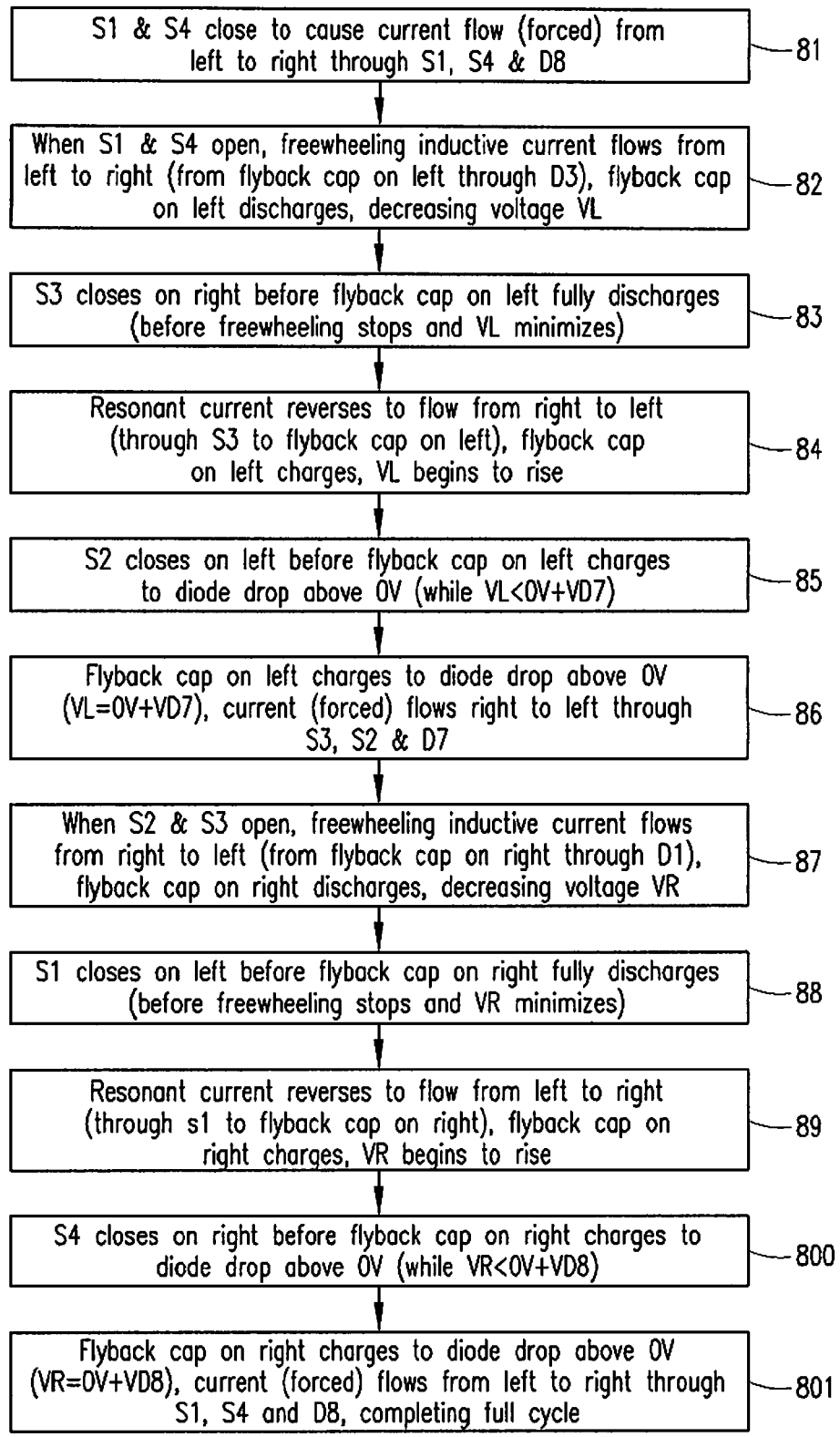
FIG. 8 is a flow diagram of operations that may be performed by the apparatus of FIG. 7 according to exemplary embodiments of the present work.

FIG. 8 shows switch control operations that produce the current and voltages shown in FIG. 9 according to exemplary embodiments. Switches S1 and S4 (see also FIG. 7), which are both initially open, are closed at 81 (t1 in FIG. 9) to cause forced current flow from left to right through S1, S4 and D8. When switches S1 and S4 open at 82 (t2 in FIG. 9), freewheeling inductive current flows from left to right from the left side capacitor through diode D3, and the left side capacitor discharges, decreasing voltage VL. At 83, switch S3 closes (between t2 and t3 in FIG. 9) before the left side capacitor fully discharges (i.e., before freewheeling stops and VL minimizes). The resonant current reverses to flow from right to left at 84, through S3 to the left side capacitor. The left side capacitor charges, and VL begins to rise. Switch S2 closes at 85 (t3 in FIG. 9) before the left side capacitor charges to a diode drop above 0V (i.e., while VL<0V+VD7). As shown at 86, when the left side capacitor charges to a diode drop above 0V (i.e., VL=0V+VD7); forced current flows from right to left through S3, S2 & D7. This completes the first current reversal operation.

The next current reversal operation proceeds analogously. When switches S2 and S3 open at 87 (t4 in FIG. 9), freewheeling inductive current flows from right to left, from the right side capacitor through diode D1. The right side capacitor discharges, decreasing voltage VR. At 88, switch S1 closes (between t4 and t5 in FIG. 9) before the right side capacitor fully discharges (i.e., before freewheeling stops and VR minimizes). The resonant current reverses to flow from left to right at 89, through switch S1 to the right side capacitor. The right side capacitor charges, and VR begins to rise. Switch S4 closes at 800 (t5 in FIG. 9) before the right side capacitor charges to a diode drop above 0V (i.e., while VR<0V+VD8).

As shown at 801, when the right side capacitor charges to a diode drop above 0V (i.e., VR=0V+VD8), forced current flows from left to right through S1, S4 and D8. This completes the second current reversal operation.

FIG. 10 illustrates in tabular format the various configurations that the current switching structure of FIG. 7 sequentially assumes (under control of the switch controller) during the current reversal examples shown in and described relative to FIGS. 7-9. Time proceeds downwardly in FIG. 10, as indicated by the timing reference points t1-t7 (see also FIG. 9). As shown in FIG. 10, the current switching structure is initially set to switch configuration #1, with all switches open, after which it is controlled to repeat continuously the following sequence of configurations: #2, #1, #3A, #4, #1, #5A. In configurations #2 and #4, power supply current flows through the motor winding, by virtue of the path between the +V and ground power supply rails. Note the transition from configuration #2 to configuration #4, and the complementary transition from configuration #4 back to configuration #2. During a first interval of each transition, the structure assumes intermediate configuration #1, wherein all switches are open, and freewheeling inductive current discharges the associated capacitor. During respective subsequent intervals of the transitions, the structure assumes respectively associated intermediate configurations #3A and #5A, which permit a reversed current in the motor winding to charge the associated capacitor.

Various other embodiments that use the current switching structure of FIG. 7 employ one or more of following operations with respect to reversing current initially flowing from left to right: (1) switch S1 opens before switch S4 opens, provided switch S4 opens before switch S3 closes; (2) switches S3 and S2 are closed at nearly the same time or shortly after the time that switches S1 and S4 are opened; and/or (3) switch S2 is closed before switch S3 is closed, provided switch S3 is closed before the voltage across the capacitor reaches its minimum value. Various other embodiments that use the current switching structure of FIG. 7 employ one or more of the following operations with respect to reversing current initially flowing from right to left: (1) switch S3 opens before switch S2 opens, provided switch S2 opens before switch S1 closes; (2) switches S1 and S4 are closed at nearly the same time or shortly after the time that switches S2 and S3 are opened; and/or (3) switch S4 is closed before switch S1 is closed, provided switch S1 is closed before the voltage across the capacitor reaches its maximum value.

Referring again to FIG. 7, some embodiments provide switches S7 and S8 respectively in parallel with diodes D7 and D8, as shown by broken line. The switch controller operates the switches S7 and S8 to implement a power saving feature. More specifically, whenever diode D7 or D8 is forward-biased and conducting power supply current, the respectively corresponding switch S7 or S8 may be closed to save power.

Figure 11:
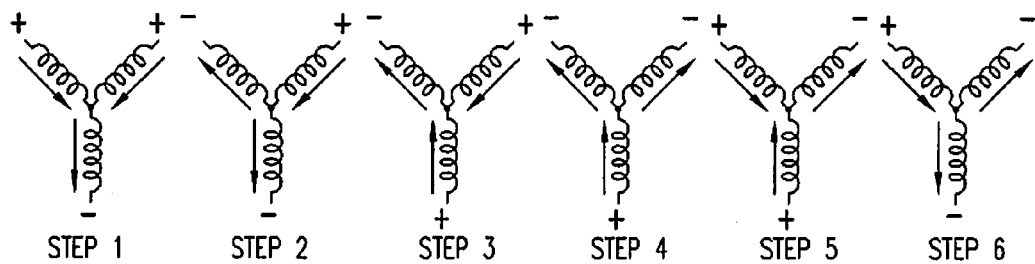
FIGS. 11 and 12 diagrammatically illustrate current control operations that are conventionally employed with respect to Y and Δ-connected 3-phase motors, respectively.
Figure 12:
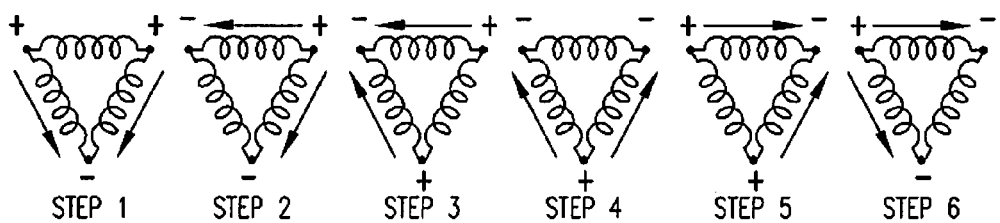

For many 3-phase stepper motors and brushless DC motors, implementation of flyback control as described above requires alternating between positive flyback control (e.g., FIG. 3) and negative flyback control (e.g., FIG. 7). For example, FIGS. 11 and 12 illustrate typical steps of conventional Y (FIG. 11) and Δ (FIG. 12) connection 3-phase motors. The directions of current flow in the windings are indicated by the arrows beside the windings in FIGS. 11 and 12. As shown in FIGS. 11 and 12, a plus (+) designates a node that is presently sourcing current, and a minus (−) designates a node that is presently sinking current. Switching a node from current sink to current source (a minus-to-plus transition) requires positive flyback control, and switching a node from current source to current sink (a plus-to-minus transition) requires negative flyback control. Thus, for example, the transitions from Step 1 to Step 2 in each configuration require negative flyback control, and the transitions from Step 2 to Step 3 in each configuration require positive flyback control.

Figure 13:
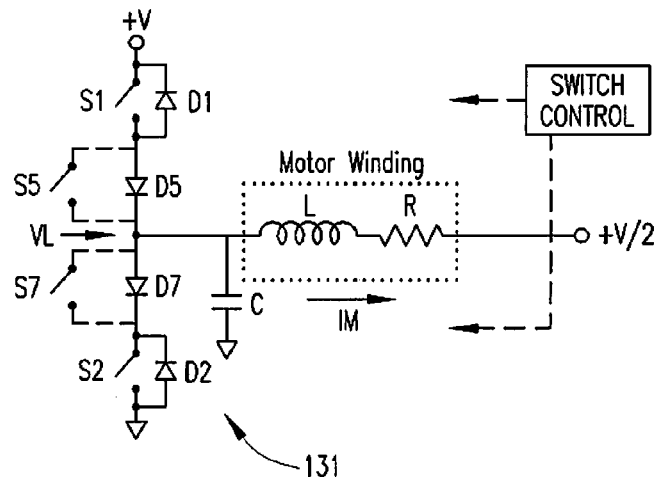
FIG. 13 diagrammatically illustrates an apparatus for controlling current in electric motor windings such as shown in FIGS. 11 and 12 according to exemplary embodiments of the present work.

For purposes of analysis, current control within a given winding of either of the configurations of FIGS. 11 and 12 may be modeled as a single winding driven at one end by a current switching structure, and having the other end connected to a fixed voltage midway between the voltages that supply the current switching structure. FIG. 13 diagrammatically illustrates an example of this model. In FIG. 13, the winding of the model is driven by a positive/negative flyback current switching structure shown at 131. The structure 131 differs from the prior art approach, wherein the VL node is controlled simply by the left half of the H-bridge (S1, D1, S2 and D2) of FIG. 1, and there is no capacitor C and no diodes D5 and D7. Beginning with both S1 and S2 open, the switching sequence in the prior art approach is: close S1; open S1; close S2; open S2; close S1; etc.

The current switching structure 131 of FIG. 13 is capable of using both positive and negative flyback operation to transition the node VL between the plus and minus states shown in, and described relative to, FIGS. 11 and 12. A current control arrangement having three instances of the current switching structure 131, respectively connected to each of the three accessible nodes of either the Y or Δ-connected motors of FIGS. 11 and 12, will be capable of controlling the transitions through the steps illustrated in FIGS. 11 and 12. FIG. 13 models an example of the current switching structure 131 connected to one node of either a Y or Δ-connected 3-phase motor to control current in the motor. Operations of the current switching structure 131 are described with reference to FIG. 14, and further with reference to the timing diagram of FIG. 15. The times t1-t7 in the example of FIG. 15 temporally correspond to times t1-t7 in the examples of FIGS. 5 and 9.

Figure 14:
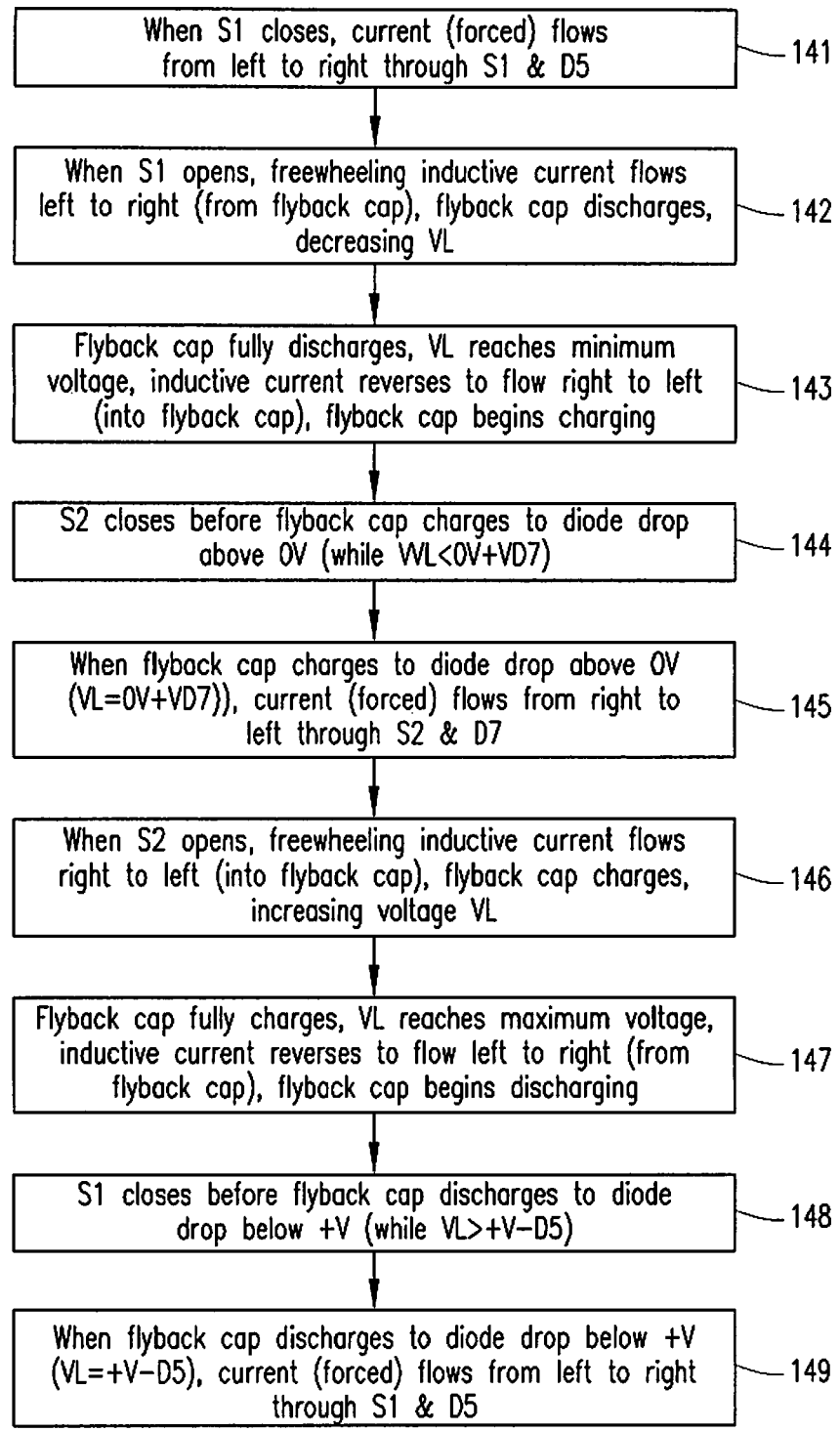
FIG. 14 is a flow diagram of operations that may be performed by the apparatus of FIG. 13 according to exemplary embodiments of the present work.

Operations 142-145 in FIG. 14 represent negative flyback that reverses left-to-right current in FIG. 13, to produce right-to-left current. This produces at the VL node in FIG. 13 a plus-to-minus (source-to-sink) transition such described above relative to FIGS. 11 and 12. Similarly, operations 146-149 in FIG. 14 represent positive flyback that reverses right-to-left current in FIG. 13, to produce left-to-right current. This produces at the VL node in FIG. 13 a minus-to-plus (sink-to-source) transition such as described relative to FIGS. 11 and 12.

Considering now a plus-to-minus transition at the VL node in FIG. 13, and beginning with switches S1 and S2 of FIG. 13 open, S1 first closes at 141 in FIG. 14 (t1 in FIG. 15), causing forced power supply current to flow left to right through S1 and D5. When S1 opens at 142 (t2 in FIG. 15), freewheeling inductive current flows left to right from the capacitor C of FIG. 13, discharging the capacitor and decreasing the voltage VL. The capacitor fully discharges at 143 so that the VL voltage reaches minimum value and the inductive current reverses to flow right to left into the capacitor, thus charging it. At 144, switch S2 closes (between t2 and t3 in FIG. 15) before the capacitor charges to a diode drop above 0V (i.e., while VL<0V+VD7). When the capacitor charges to a diode drop above 0V (VL=0V+VD7) at 145, forced power supply current flows from right to left through S2 and D7. This completes the plus-to-minus (source-to-sink) transition.

A minus-to-plus (sink-to-source) transition proceeds analogously at 146-149. Switch S2, still closed from the plus-to-minus transition, opens at 146 (t4 in FIG. 15), and freewheeling inductive current flows right to left into the capacitor, charging the capacitor and increasing the voltage VL. The capacitor fully charges at 147 so that the VL voltage reaches maximum value and the inductive current reverses to flow left to right from the capacitor, thus discharging it. At 148, switch S1 closes (between t4 and t5 in FIG. 15) before the capacitor discharges to a diode drop below +V (i.e., while VL>+V−VD5). When the capacitor discharges to a diode drop below +V (VL=+V−VD5) at 149, forced power supply current flows from left to right through S1 and D5. This completes the minus-to-plus (sink-to-source) transition.

Figures 15, 16:
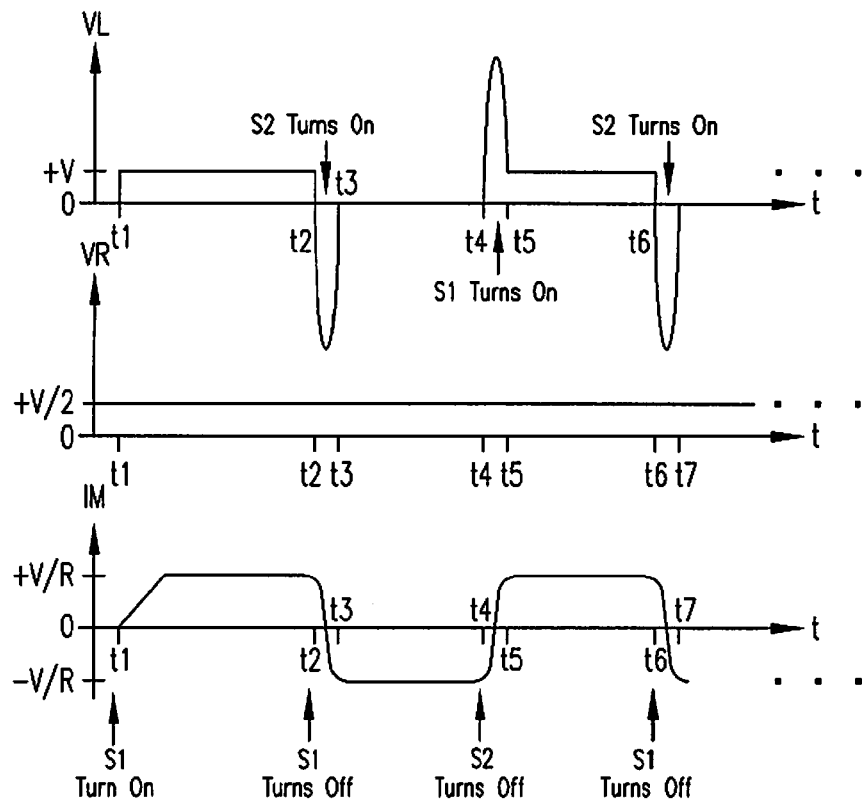
FIG. 15 is a timing diagram of operations that may be performed by the apparatus of FIG. 13 according to exemplary embodiments of the present work.
FIG. 16 illustrates in tabular format a sequence of switching configurations that may be assumed by the current switching structure of FIG. 13 in response to the switch controller of FIG. 13 according to exemplary embodiments of the present work.

FIG. 16 illustrates in tabular format the various configurations that the current switching structure of FIG. 13 sequentially assumes (under control of the switch controller) during the current reversal examples described above with respect to FIGS. 13-15. Time proceeds downwardly in FIG. 16, as indicated by the timing reference points t1-t7 (see also FIG. 15). As shown in FIG. 16, the current switching structure is initially set to switch configuration #101, with both switches S1 and S2 open, after which it is controlled to repeat continuously the following sequence of configurations: #201, #101, #301, #101. In configurations #201 and #301, forced power supply current flows through the motor winding. Note the transition from configuration #201 to configuration #301, and the complementary transition from configuration #301 back to configuration #201. During each transition, the structure assumes configuration #101, wherein both switches S1 and S2 are open and the corresponding diode (D5 or D7) blocks current flow to the associated power supply node (+V or ground in the FIG. 13 example) to permit freewheeling inductive current to charge/discharge the capacitor fully during a first interval of the transition, and then reverse direction to discharge/charge the capacitor during a subsequent interval of the transition.

Various other embodiments that use the current switching structure 131 of FIG. 13 employ one or both of following operations: (1) switch S2 is closed at nearly the same time or shortly after the time that switch S1 is opened when reversing from current source to current sink; and/or (2) switch S1 is closed at nearly the same time or shortly after the time that switch S2 is opened when reversing from current sink to current source.

Referring again to FIG. 13, some embodiments provide switches S5 and S7 respectively in parallel with diodes D5 and D7, as shown by broken line. The switch controller operates the switches S5 and S7 to implement a power saving feature. More specifically, whenever diode D5 or D7 is forward-biased and conducting power supply current, the respectively corresponding switch S5 or S7 may be closed to save power.

Referring generally to FIGS. 3, 7 and 13, in some embodiments, switches S1 and S3 are implemented with p-channel FETs (field effect transistors), and switches S2 and S4 (and S5-S8) are implemented with n-channel FETs. In some embodiments, switches S1 and S3 are implemented with pnp BJTs (bipolar junction transistors), and switches S2 and S4 are implemented with npn BJTs. In some embodiments, the S5/D5, S6/D6, S7/D7 and S8/D8 pairs are implemented with SCRs (silicon-controlled rectifiers). Although the ends of capacitors C opposite the motor winding are shown coupled to ground in the illustrated embodiments, various embodiments connect those ends of the capacitors to various voltages other than ground.

Although exemplary embodiments of the present work are described above in detail, this does not limit the scope of the work, which can be practiced in a variety of embodiments, including embodiments wherein the flyback voltage is exclusively positive, exclusively negative, or alternating between positive and negative.

What is claimed is:

1. An apparatus for controlling current in a winding of an electric motor, the apparatus comprising:
 a current switching structure including first and second nodes adapted for coupling the winding in series therebetween, a pair of power supply nodes configured to provide power supply current to an electric motor winding being driven by said current switching structure, and a current blocking device coupled between one of said first and second nodes and one of said power supply nodes, the current blocking device configured to ensure that freewheeling inductive current at the first and second nodes is not clamped to one of said power supply nodes;
 a controller coupled to said current switching structure and configured to control said current switching structure when the winding is coupled between said first and second nodes, said controller configured for controlling said current switching structure to assume a first configuration that permits power supply current flow in a first direction from said first node through the winding to said second node, and for thereafter controlling said current switching structure to execute a first transition from said first configuration to a second configuration that permits power supply current flow in a second direction from said second node through the winding to said first node; and
 an energy storage device coupled to said one of said first and second nodes and cooperable with an inductive current that persists in said first direction through the winding during a first interval of said first transition for one of storing energy and releasing energy during said first interval, said current blocking device blocking said inductive current from said one power supply node during said first interval, said energy storage device operable, during said first transition and after said first interval, for the other of storing and releasing energy to permit a further current flow in said second direction from said second node through the winding to said first node.

2. The apparatus of claim 1, wherein said controller is further configured for controlling said current switching structure to execute a second transition from said second configuration back to said first configuration, wherein said current switching structure includes a further current blocking device coupled between the other of said first and second nodes and the other of said power supply nodes, and wherein said apparatus includes a further energy storage device coupled to said other of said first and second nodes and cooperable with another inductive current that persists in said second direction through the winding during a second interval of said second transition for one of storing energy and releasing energy during said second interval, said further current blocking device blocking said another inductive current from said other power supply node during said second interval, said further energy storage device operable, during said second transition and after said second interval, for the other of storing energy and releasing energy to permit a further current flow in said first direction from said first node through the winding to said second node.

3. The apparatus of claim 2, wherein each said energy storage device includes a capacitor, and each said current blocking device includes one of a diode, a silicon-controlled rectifier, a bipolar junction transistor, and a field effect transistor.

4. The apparatus of claim 1, wherein said energy storage device includes a capacitor, said storing energy includes charging of said capacitor, and said releasing energy includes discharging of said capacitor.

5. The apparatus of claim 4, wherein said controller is configured to control said first transition such that said current switching structure assumes said second configuration before a voltage across said capacitor reaches a predetermined level.

6. The apparatus of claim 1, wherein said controller is configured to control said current switching structure to assume, during said first transition, first and second intermediate configurations that differ from one another and from said first and second configurations.

7. An apparatus for controlling current in an electric motor having a winding structure including a plurality of windings, the apparatus comprising:
 a current switching structure including a first node adapted for coupling to the winding structure, a pair of power supply nodes configured to provide power supply current to an electric motor winding being driven by said current switching structure, and a current blocking device coupled between said first node and one of said power supply nodes, the current blocking device configured to ensure that freewheeling inductive current at the first node is not clamped to one of said power supply nodes;
 a controller coupled to said current switching structure and configured to control said current switching structure when the winding structure is coupled to said first node, said controller configured for controlling said current switching structure to assume a first configuration that permits power supply current flow in a first direction between said first node and the winding structure, and for thereafter controlling said current switching structure to execute a first transition from said first configuration to a second configuration that permits power supply current flow in a second direction between said first node and the winding structure, wherein said second direction is opposite said first direction; and
 an energy storage device coupled to said first node and cooperable with an inductive current that persists in said first direction between said first node and the winding structure during a first interval of said first transition for one of storing energy and releasing energy during said first interval, said current blocking device blocking said inductive current from said one power supply node during said first interval, said energy storage device further operable, during said first transition and after said first interval, for the other of storing and releasing energy to permit a further current flow in said second direction between said first node and the winding structure.

8. The apparatus of claim 7, wherein said energy storage device includes a capacitor that becomes one of fully charged and fully discharged during said first interval.

9. The apparatus of claim 7, wherein the motor winding structure is one of a Y-connected structure and a Δ-connected structure.

10. The apparatus of claim 7, wherein said controller is further configured for controlling said current switching structure to execute a second transition from said second configuration back to said first configuration, wherein said current switching structure includes a further current blocking device coupled between said first node and the other of said power supply nodes, and wherein said energy storage device is cooperable with another inductive current that persists in said second direction between said first node and the winding structure during a second interval of said second transition for one of storing energy and releasing energy during said second interval, said further current blocking device blocking said another inductive current from said other power supply node during said second interval, said energy storage device operable, during said second transition and after said second interval, for the other of storing energy and releasing energy to permit a further current flow in said first direction between said first node and the winding structure.

* * * * *